United States Patent
Novak et al.

(10) Patent No.: US 10,336,428 B1
(45) Date of Patent: Jul. 2, 2019

(54) MARINE PROPULSION DEVICES HAVING COOLING WATER SPRAYERS FOR COOLING AN EXHAUST MANIFOLD

(71) Applicant: Brunswick Corporation, Mettawa, IL (US)

(72) Inventors: Aaron J. Novak, North Fond du Lac, WI (US); Adam J. Kurzynski, Neenah, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/729,747

(22) Filed: Oct. 11, 2017

(51) Int. Cl.
| | | |
|---|---|---|
| B63H 20/28 | (2006.01) | |
| B63H 21/32 | (2006.01) | |
| F01N 3/04 | (2006.01) | |
| B63H 20/24 | (2006.01) | |

(52) U.S. Cl.
CPC .......... *B63H 20/28* (2013.01); *B63H 20/245* (2013.01); *B63H 21/32* (2013.01); *F01N 3/04* (2013.01); *B63B 2758/00* (2013.01)

(58) Field of Classification Search
CPC ........ B63H 21/10; B63H 21/38; B63H 21/00; B63H 21/32; F01N 3/04; F01N 3/00; F01N 3/02; F01N 3/08; F01N 3/20
USPC ................ 440/88 C, 88 G, 89 B, 89 C, 89 R
See application file for complete search history.

(56) References Cited

U.S. PATENT DOCUMENTS

| | | | |
|---|---|---|---|
| 5,803,036 A | 9/1998 | Takahashi | |
| 5,820,426 A | 10/1998 | Hale | |
| 5,873,330 A | 2/1999 | Takahashi | |
| 6,120,335 A | 9/2000 | Nakase et al. | |
| 6,226,984 B1 * | 5/2001 | Ford | B63H 21/32 60/310 |
| 6,461,208 B2 | 10/2002 | Suzuki et al. | |
| 7,001,231 B1 | 2/2006 | Halley et al. | |
| 7,625,257 B1 * | 12/2009 | Broman | B63H 20/26 440/89 B |
| 7,942,138 B1 * | 5/2011 | Belter | B63H 20/24 440/89 B |
| 8,500,501 B1 | 8/2013 | Taylor et al. | |
| 8,540,536 B1 | 9/2013 | Eichinger et al. | |
| 8,763,566 B1 | 7/2014 | Taylor et al. | |
| 9,365,274 B1 | 6/2016 | George et al. | |
| 9,365,275 B1 | 6/2016 | Habeck et al. | |
| 9,534,526 B1 | 1/2017 | Eichinger et al. | |
| 9,616,987 B1 | 4/2017 | Langenfeld et al. | |
| 10,233,818 B1 * | 3/2019 | Reichardt | F01P 3/205 |

* cited by examiner

*Primary Examiner* — Lars A Olson
(74) *Attorney, Agent, or Firm* — Andrus Intellectual Property Law, LLP

(57) ABSTRACT

A marine propulsion device has an internal combustion engine, an exhaust manifold that conveys exhaust gas from the internal combustion engine, and a cooling water sprayer that is configured to spray a flow of cooling water radially outwardly toward an inner diameter of the exhaust manifold. The cooling water sprayer has a sprayer body that is configured to convey the flow of cooling water radially into the exhaust manifold and a nozzle configured to spray the flow of cooling water radially outwardly in a fan-shaped pattern toward the inner diameter of the exhaust manifold.

22 Claims, 7 Drawing Sheets

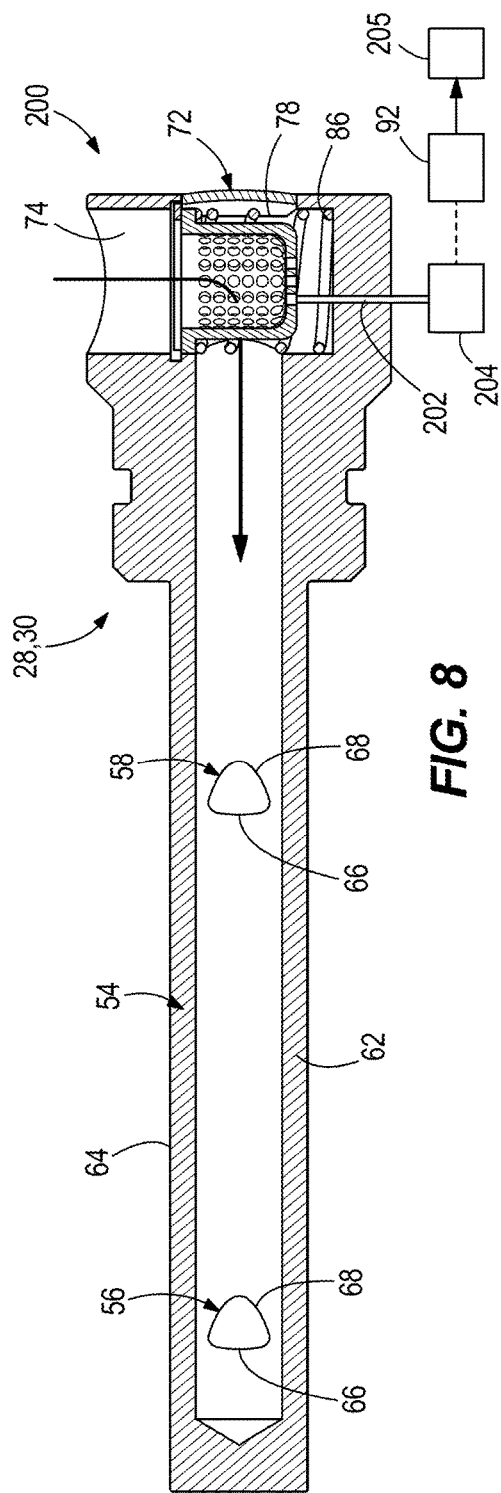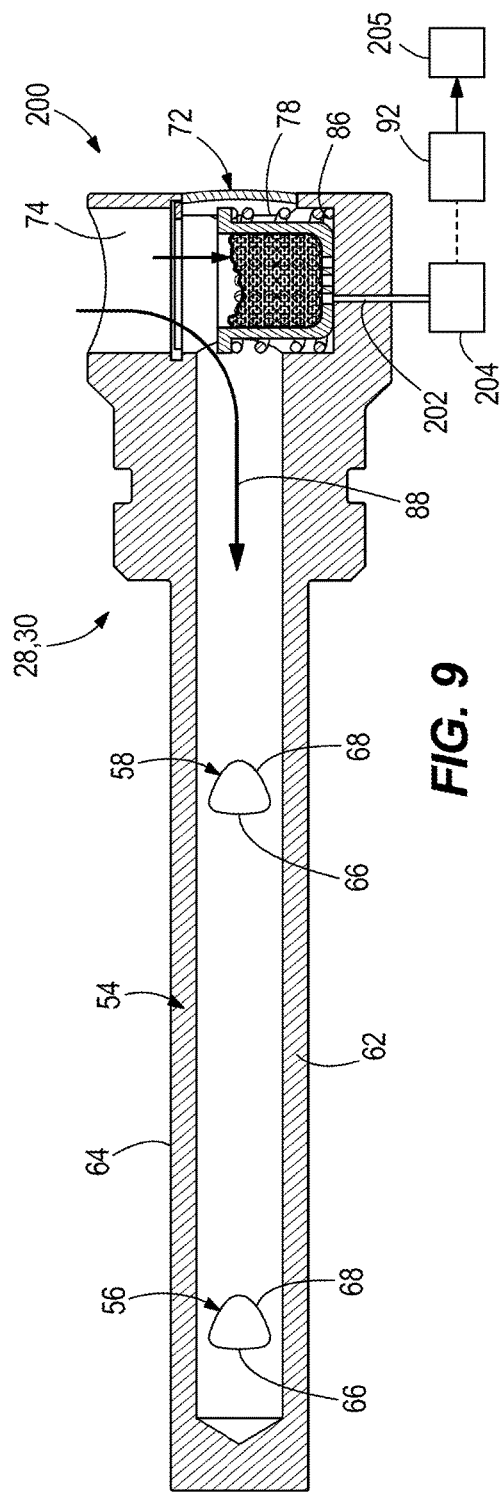

MARINE PROPULSION DEVICES HAVING COOLING WATER SPRAYERS FOR COOLING AN EXHAUST MANIFOLD

FIELD

The present disclosure relates to marine propulsion devices, and particularly to cooling systems and cooling water sprayers for marine propulsion devices.

BACKGROUND

The following U.S. Patents are incorporated herein by reference in entirety.

U.S. Pat. No. 9,616,987 discloses a marine engine having a cylinder block with first and second banks of cylinders disposed along a longitudinal axis and extending transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,365,275 discloses an outboard marine propulsion device having an internal combustion engine with a cylinder head and a cylinder block, and an exhaust manifold that discharges exhaust gases from the engine towards a catalyst housing. The exhaust manifold has a plurality of horizontally extending inlet runners that receive the exhaust gases from the engine and a vertically-extending collecting passage that conveys the exhaust gases from the plurality of horizontally-extending inlet runners to a bend that redirects the exhaust gases downwardly towards the catalyst housing.

U.S. Pat. No. 8,540,536 discloses a cooling system for a marine engine having an exhaust manifold with a first end receiving hot exhaust gas from the marine engine and a second end discharging the exhaust gas, and an elongated cooling water jacket extending adjacent to the exhaust manifold. The cooling water jacket receives raw cooling water at a location proximate to the second end of the exhaust manifold, conveys raw cooling water adjacent to the exhaust manifold to thereby cool the exhaust manifold and warm the raw cooling water, and thereafter discharges the warmed cooling water to cool the internal combustion engine.

U.S. Pat. No. 8,500,501 discloses an outboard marine drive including a cooling system drawing cooling water from a body of water in which the outboard marine drive is operating and supplying the cooling water through cooling passages in an exhaust tube in the driveshaft housing, a catalyst housing, and an exhaust manifold, and thereafter through cooling passages in the cylinder head and the cylinder block of the engine. A 3-pass exhaust manifold is provided. A method is provided for preventing condensate formation in a cylinder head, catalyst housing, and exhaust manifold of an internal combustion engine of a powerhead in an outboard marine drive.

U.S. Pat. No. 7,001,231 discloses a water cooling system for an outboard motor having a water conduit that extends through both an idle exhaust relief passage and a primary exhaust passage. Water within the water conduit flows through first and second openings to distribute sprays or streams of water into first and second exhaust manifolds, which can be the primary and idle exhaust relief passages of an outboard motor.

SUMMARY

This Summary is provided to introduce a selection of concepts that are further disclosed herein below in the Detailed Description. This Summary is not intended to identify key or essential features of the claimed subject matter, nor is it intended to be used as an aid in limiting scope of the claimed subject matter. In certain examples disclosed herein, a marine propulsion device has an internal combustion engine, an exhaust manifold that conveys exhaust gas from the internal combustion engine, and a cooling water sprayer that is configured to spray a flow of cooling water radially outwardly toward an inner diameter of the exhaust manifold. The cooling water sprayer has an elongated sprayer body that is configured to convey the flow of cooling water radially into the exhaust manifold and a nozzle configured to spray the flow of cooling water radially outwardly in a fan-shaped pattern toward the inner diameter of the exhaust manifold.

BRIEF DESCRIPTION OF THE DRAWINGS

FIGS. 8 and 9 depict a second example of the cooling water sprayer according to the present disclosure.

DETAILED DESCRIPTION OF THE DRAWINGS

Figure 1:
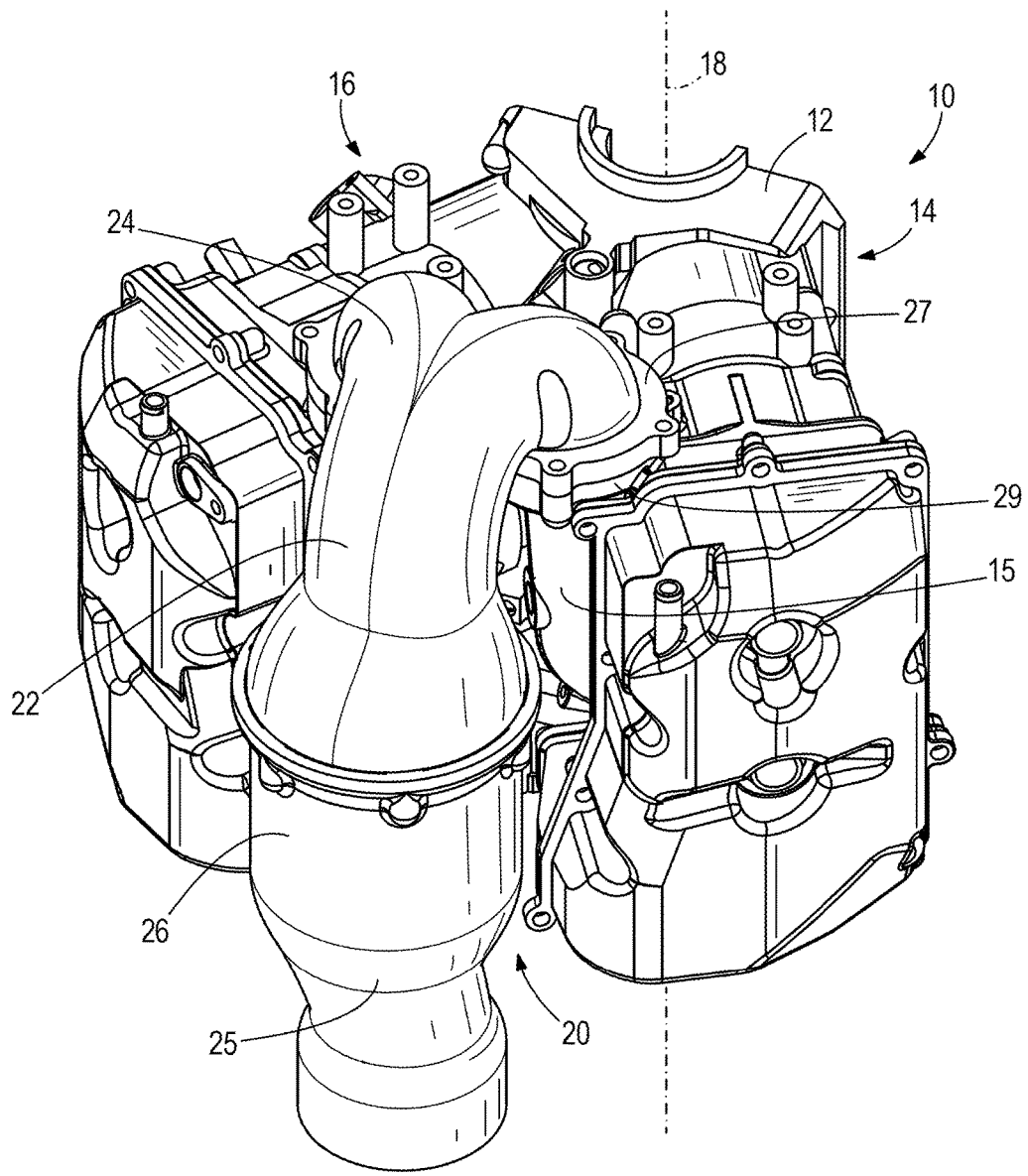
FIG. 1 is taken from U.S. Pat. No. 9,616,987 and is a perspective view of an internal combustion engine for marine propulsion device.
Figure 2:
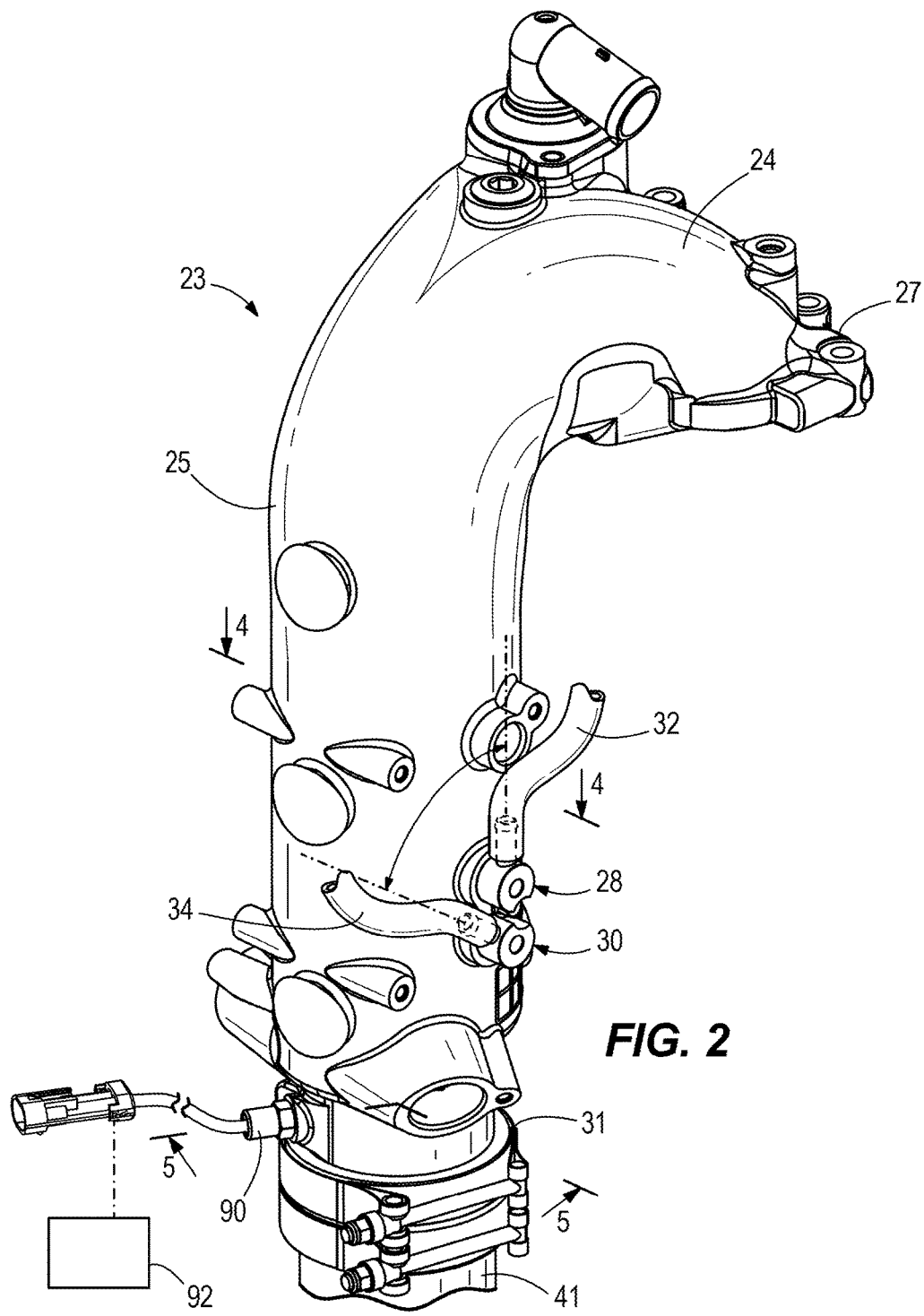
FIG. 2 is a perspective view of an exhaust manifold according to the present disclosure.

FIG. 1 is taken from U.S. Pat. No. 9,616,987 and depicts an internal combustion engine 10 configured for use in an outboard motor. The internal combustion engine 10 has a cylinder block 12 with first and second banks of cylinders 14, 16 that are disposed along a vertical axis 18 and extend transversely with respect to each other in a V-shape so as to define a valley 20 therebetween. The number and configuration of cylinders can vary from what is shown. An exhaust manifold 22 is configured to convey exhaust gas from the internal combustion engine 10. The configuration of the exhaust manifold 22 can also vary from what is shown. In the illustrated example, the exhaust manifold 22 is disposed in the valley 20 and initially conveys the exhaust gas vertically upwardly from cast-in exhaust conduits 15 on the respective banks of cylinders 14, 16, through a 180-degree bend 24, and then vertically downwardly through an elongated conduit 25, which can include a catalyst receptacle 26 having a catalyst therein for treating the exhaust gas, all as disclosed in the '987 patent.

Figure 3:
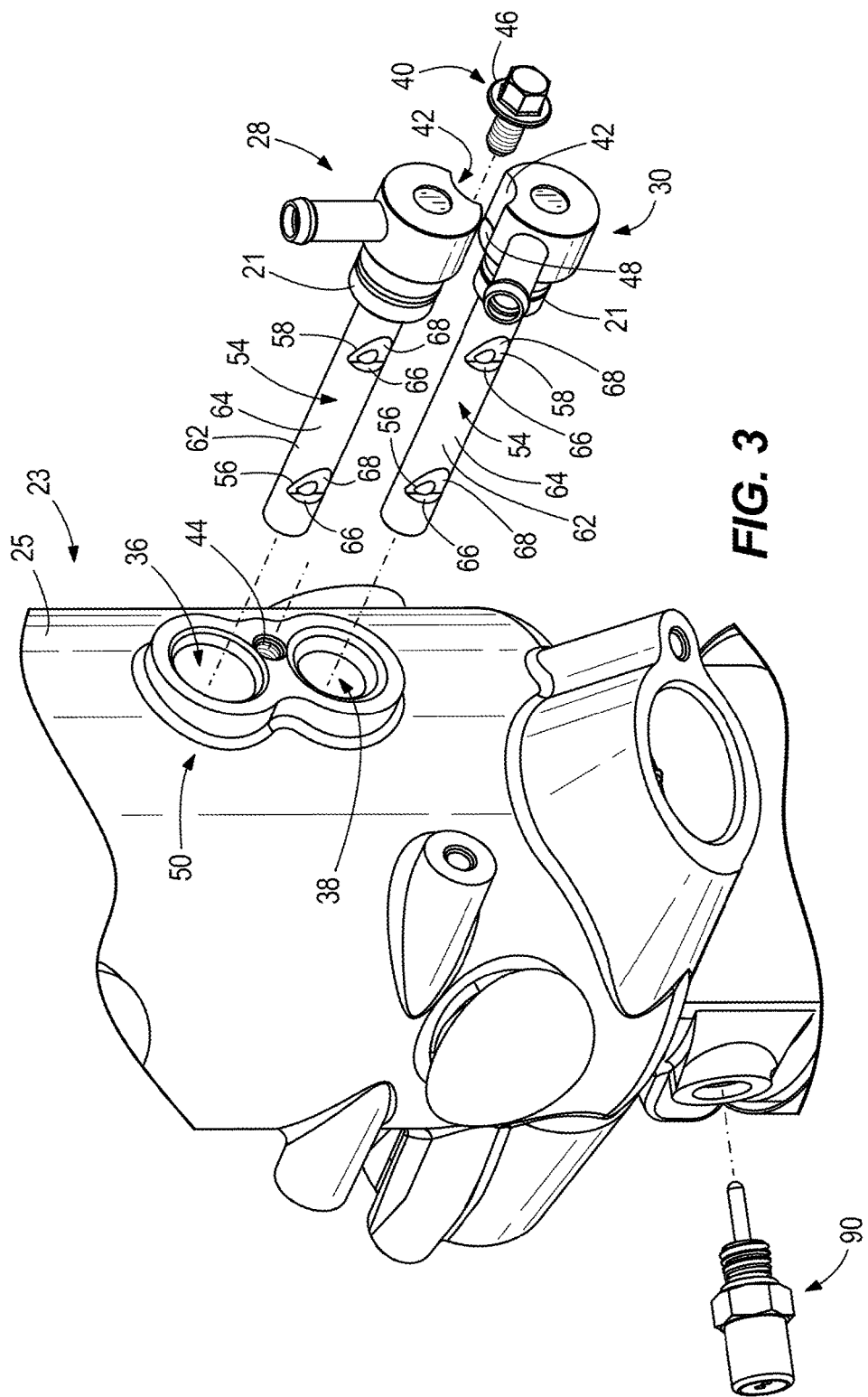
FIG. 3 an exploded view of a lower portion of the exhaust manifold and cooling water sprayers for spraying cooling water into the exhaust manifold.
Figure 4:
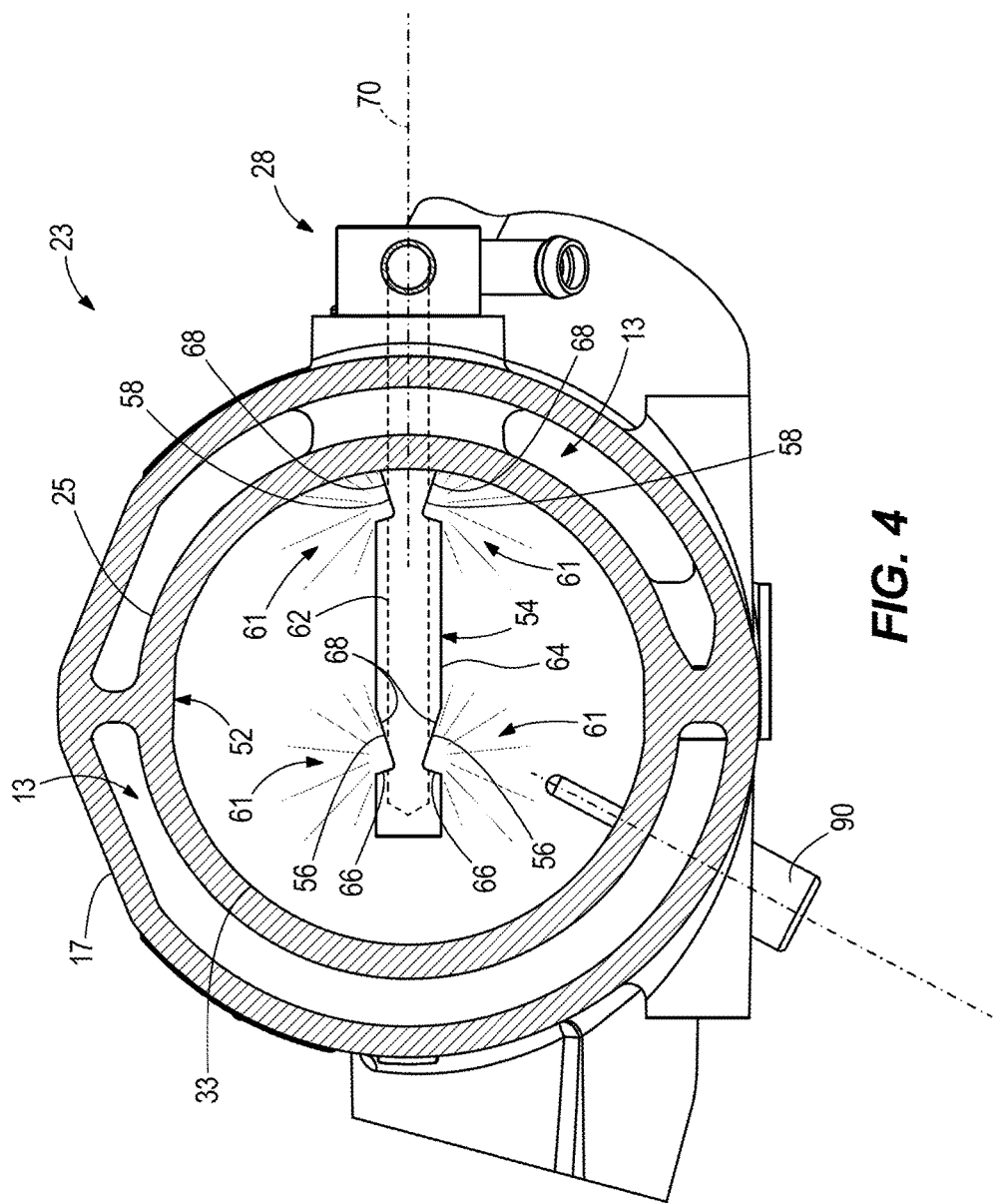
FIG. 4 is a view of Section 4-4, taken in FIG. 2.
Figure 5:
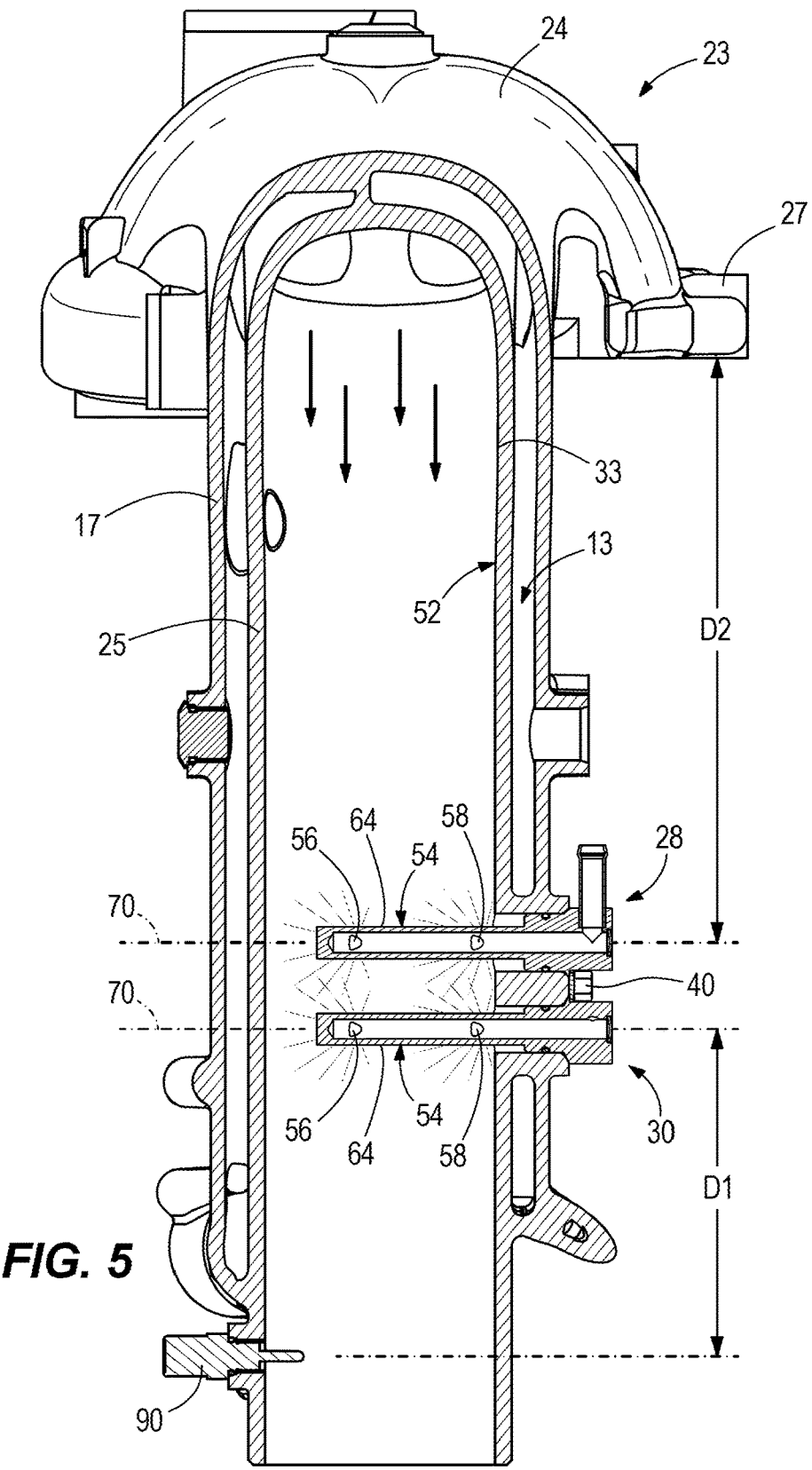
FIG. 5 is a view of Section 5-5, taken in FIG. 2.

FIGS. 2-5 depict an exhaust manifold 23 for use an internal combustion engine for an outboard motor configuration, such as the exemplary internal combustion engine 10 shown in FIG. 1. Like reference numbers are used for features that are similar to the exhaust manifold 22. Similar to the example in FIG. 1, the exhaust manifold 23 has a 180-degree bend 24 and elongated conduit 25. Flanges 27 on the 180-degree bend 24 mate with upwardly-facing flanges 29 (see FIG. 1) on the cast-in conduits 15 on the first and second banks of cylinders 14, 16. As disclosed in the '987 patent, exhaust gases from the respective cast-in conduits 15 are merged in the 180-degree bend 24 and then conveyed downwardly through the elongated conduit 25. A flange 31 is mated with a downstream exhaust tube 41 to further convey the exhaust gas away from the internal combustion engine 10. As shown in FIGS. 4 and 5, a cooling jacket 17 is disposed on the exhaust manifold 23 and defines a cooling channel 13 that is configured to convey cooling water upwardly and/or downwardly alongside the exhaust manifold 23, in a heat exchange relationship with a sidewall 33 of the exhaust manifold 23 and the relatively hot exhaust gas flowing there through. Unlike the example shown in FIG. 1, the exhaust manifold 23 does not have the optional catalyst receptacle 26 and catalyst therein.

During research and experimentation, the present inventors have determined that it is desirable to cool relatively hot exhaust gases emitted from the internal combustion engine. It is desirable to do so in a reliable, uniform and complete manner by for example pumping cooling water through the channel 13 and/or by injecting the cooling water into the flow of exhaust gas at various water pressures and flow rates.

In certain systems, the present inventors have also found it to be desirable to omit portions of the cooling jacket along certain components of the exhaust system, so as to reduce the weight of the outboard motor and to free up design space for other components of the outboard motor. The cooling jacket can be omitted on components or portions of components such as the exhaust manifold, exhaust hose, muffler crossover hose, propeller shaft seal, gear case bearing carrier O-ring, and/or idle relief plenum. However omission of the cooling jacket from these components can make it more challenging to achieve the desired reliable, uniform and complete cooling, and if components of the exhaust system exceed their temperature limits, then the internal combustion engine can become incapable of running properly or other catastrophic failures can occur.

During research and experimentation, the present inventors have also found that known cooling systems for marine propulsion devices can be ineffective, particularly in arrangements where the cooling jacket is omitted from components of the exhaust system. Through research and experimentation, as further disclosed herein below, the present inventors have determined that it is possible to achieve more uniform and complete cooling of exhaust gases by using one or more cooling water injectors (sprayers) having a novel nozzle configuration with an angle-milled oblique orifice, oriented with respect to the water flow path so as to cause the flow of cooling water to form a "fan" pattern, even at relatively low pressures and under a wide range of operational conditions. Advantageously, the orifice can be sized large enough to help limit the likelihood of debris blocking, and to enable relatively easier cleaning of the nozzle, compared to the prior art. According to the present disclosure, the present inventors have found it possible to achieve better and more reliable cooling, even in components of the exhaust system where the cooling jacket is omitted. The present inventors have also determined that it can be advantageous to provide more than one cooling water sprayer, including multiple cooling water sprayers that receive cooling water from separate sources, for redundancy in case one of the cooling water sprayers become inoperable, for example due to debris blocking or other failure.

Referring now to FIGS. 2-5, a novel cooling system is provided for cooling the exhaust manifold 23 and the exhaust gas flowing through the exhaust manifold 23. In the illustrated example, the cooling system includes first and second cooling water sprayers 28, 30 that are configured to spray first and second flows of cooling water into the exhaust gas, respectively. The cooling water sprayers 28, 30 are vertically aligned (e.g., stacked) with respect to each other and with respect to the exhaust manifold 23. A first conduit 32 is connected to the first cooling water sprayer 28 and a separate, second conduit 34 is connected to the second cooling water sprayer 30. The first and second conduits 32, 34 convey the separate, first and second flows of cooling water, respectively, to the cooling water sprayers 28, 30. The first and second conduits 32, 34 are separate from each other such that the first and second flows of cooling water remain separate as they are conveyed to the respective cooling water sprayers 28, 30, in parallel. In the illustrated example, the first conduit 32 receives the first flow of cooling water via the cooling channel 13. The second conduit 34 receives the second flow of cooling water via a water fitting on the exhaust conduit 25. Optionally, each of the first and second conduits 32, 34 are provided with a conventional primary filter (not shown) configured to filter the cooling water flowing therethrough. The first and second flows of cooling water can both derive from a conventional upstream cooling water pump that pumps raw water from the body of water in which the outboard motor is operating. The raw water can be obtained from, for example, one or more conventional cooling water inlets on the gearcase of the outboard motor.

Referring to FIG. 3, the first cooling water sprayer 28 is fitted in a first radial through-bore 36 in the exhaust manifold 23. The second cooling water sprayer 30 is fitted in a second radial through-bore 38 in the exhaust manifold 23. The first and second radial through-bores 36, 38 each extend through the sidewall 33 of the exhaust manifold 23, and through the cooling jacket 17 on the sidewall 33. Optionally, the first and second radial through-bores 36, 38 can have different sizes (e.g. diameters) with respect to each other, which correspond to differently-sized base portions 21 of the cooling water sprayers 28, 30, to prevent an incorrect assembly of the cooling water sprayers 28, 30 with the exhaust manifold 23. A retainer 40 retains both of the cooling water sprayers 28, 30 with respect to the exhaust manifold 23. In the illustrated example, both of the cooling water sprayers 28, 30 have an outer circumference with a radial notch 42 in which the retainer 40, in this example a bolt, is registered, to thereby retain the cooling water sprayers 28, 30 in place. The retainer 40 has a threaded shank that is received in a threaded hole 44 located in between the first and second radial through-bores 36, 38. The retainer 40 further has an outer flange 46 that registers with radial engagement surfaces 48 located within the respective radial notches 42. Threading the retainer 40 into the threaded hole 44 sandwiches the radial engagement surfaces 48 between the outer flange 46 and a boss 50 on the exhaust manifold 23, through which the first and second radial through-bores 36, 38 are formed, thereby retaining the cooling water sprayers 28, 30 in place.

Referring to FIGS. 4 and 5, the cooling water sprayers 28, 30 are specially configured to spray the respective first and second flows of cooling water radially outwardly toward the inner diameter 52 of the sidewall 33 of the exhaust manifold 23. In certain examples, each cooling water sprayer 28, 30 is configured to spray the flow of cooling water so that a swirling flow of cooling water results, i.e. circumferentially around and spirally downwardly along the inner diameter 52. Each of the cooling water sprayers 28, 30 has an elongated sprayer body 54 that radially extends into the exhaust manifold 23 and conveys the respective flow of cooling water radially inwardly through the cooling jacket 17, through the cooling channel 13, and through the sidewall 33 of the exhaust manifold 23 and toward the interior of the conduit 25. As noted in FIGS. 3 and 4, each of the cooling water sprayers 28, 30 also has first and second pairs of diametrically-opposing nozzles 56, 58 that are each configured to spray the flow of cooling water radially outwardly in a fan-shaped pattern 61 (see FIG. 4) toward the inner diameter 52 of the radially exhaust manifold 23. The sprayer body 54 includes a cylinder 62 that radially extends into the conduit 25. As shown in FIG. 4, the flows of cooling water are sprayed radially outwardly from the nozzles 56, 58, radially outwardly from the cylinder 62. The first and second pairs of nozzles 56, 58 are spaced apart from each other along the sprayer body 54. Each of the nozzles 56, 58 have the same or roughly the same shape, size and orientation.

Figure 6:
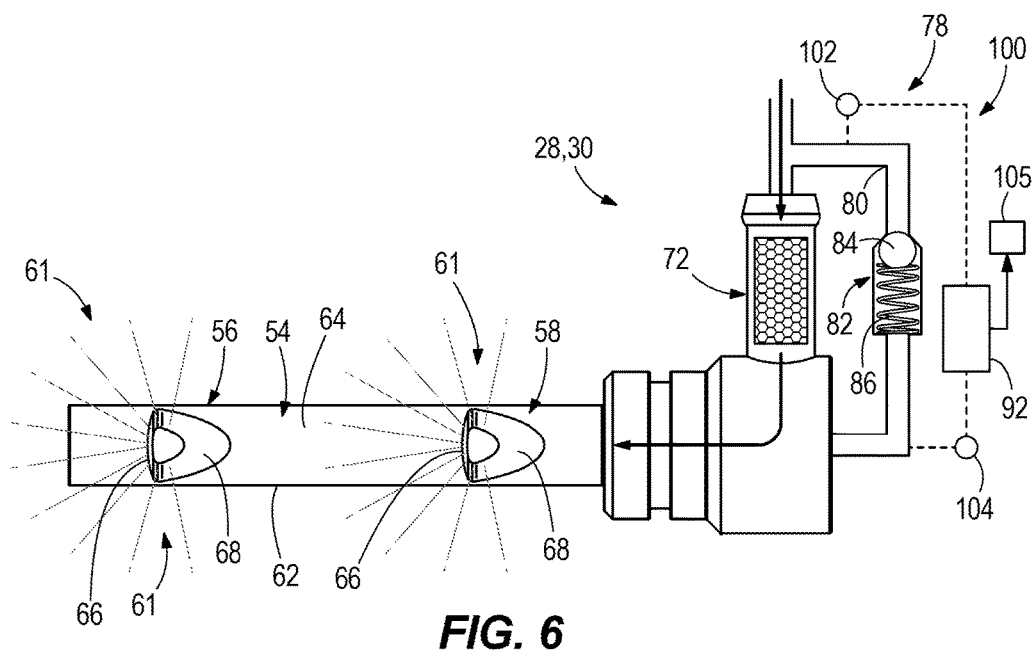
FIGS. 6 and 7 depict a first example of a cooling water sprayer according to the present disclosure.
Figure 7:
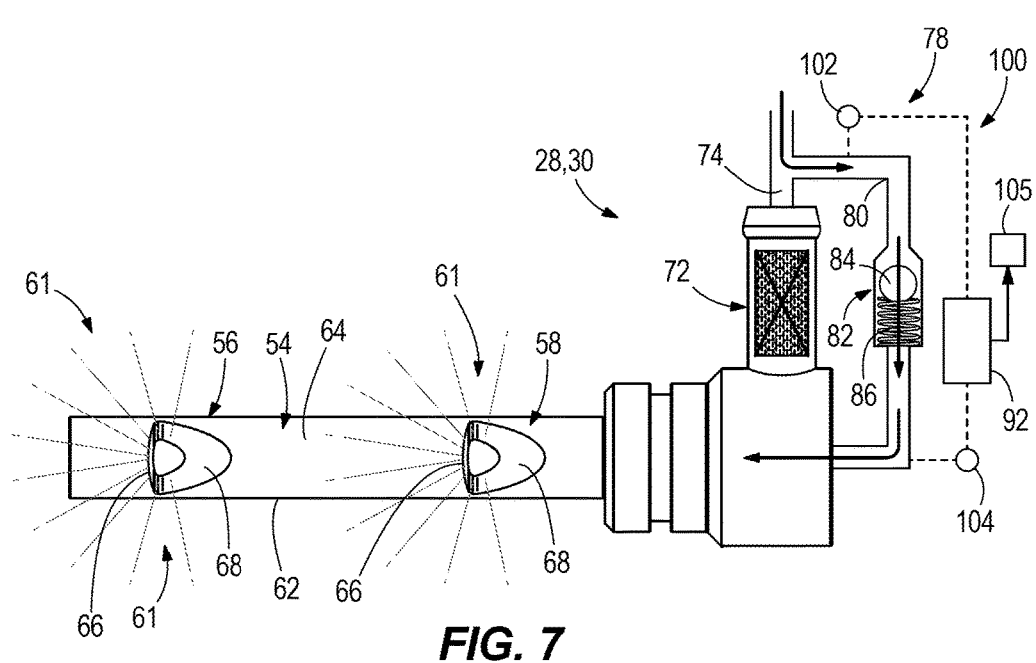

Referring to FIGS. 4, 6 and 7, the nozzles 56, 58 are defined by a tangential cutout in the outer surface of the cylinder 62. Each tangential cutout has radially extending endwall 66 upon which the flow of cooling water impinges as it flows through the cylinder 62. Each cutout also has tangentially tapered group of sidewalls 68 that extend tangentially outwardly and extend from the outer surface 64 of the cylinder 62 to the endwall 66. Each tangentially tapered group of sidewalls 68 defines a three-sided radial aperture in the cylinder 62. Stated another way, the sprayer body 54 is elongated along a sprayer body axis 70 and the endwall 66 extends approximately perpendicularly radially outwardly with respect to the sprayer body axis 70. The tangentially tapered group of sidewalls 68 extends at an approximately tangential angle to the sprayer body axis 70 and at a substantially perpendicular angle to the endwall 66. Other configurations can be employed to achieve the fan-shaped pattern 61.

During research and experimentation, the present inventors have also determined that a blockage or other failure of one or both of the cooling water sprayers 28, 30 can cause an excessively high exhaust gas temperature, which can damage the internal combustion engine and/or components thereof. A failure of the cooling water sprayers 28, 30 can result from impassible debris from the inlet port of the cooling system and/or impassible debris that is built up and liberated from inside the cooling system. As such, the present inventors have determined that it would be desirable to provide a filter arrangement with a bypass mechanism that facilitates continued flow of cooling water in the event that the filter becomes clogged with debris or otherwise fails. Such a system can optionally have an indicator for identifying an impending or actual bypass condition of the filter to a user/operator.

FIGS. 6-7 and 8-9 depict alternate examples of the cooling water sprayers 28, 30. Each of the depicted examples has a filter 72 that is incorporated with the respective cooling water sprayer 28, 30 and configured to filter the respective flow of cooling water. In each of the examples, the filter 72 is disposed in the respective sprayer body 54. The sprayer body 54 has an inlet 74 that conveys the flow of cooling water to the filter 72, and then on to the respective first and second pairs of nozzles 56, 58, and a bypass mechanism 78 that conveys the flow of cooling water around the filter 72 when the filter 72 becomes clogged with debris. The configuration of the bypass mechanism 78 differs in the respective examples and is further disclosed with reference to each example herein below.

In the example shown in FIGS. 6 and 7, the bypass mechanism 78 includes a bypass passageway 80 that extends parallel to the flow of cooling water from the inlet 74 to the sprayer body 54. A one-way check valve 82 is disposed in the bypass passageway 80, and is normally closed, as shown in FIG. 6. In the illustrated example, a check ball 84 is biased into a seated position by a compression spring 86, which closes the bypass passageway 80. When the filter 72 becomes clogged with debris, as shown in FIG. 7, pressure from the flow of cooling water builds up and forces the check ball 84 out of the seated position, against the bias of the compression spring 86. Thus, the bypass mechanism 78 allows continued flow of cooling water through the bypass passageway 80 despite a clogged condition of the filter 72. The resiliency of the compression spring 86 can be selected by the designer of the system to provide a certain range of restriction, above various normal operating pressures of the cooling water.

Optionally, the bypass mechanism 78 can include an indicator device 100 for indicating to the operator that the filter 72 has become clogged, requiring flow of cooling water through the bypass passageway 80. The exact configuration of the indicator device 100 can vary. In the example shown in FIGS. 6 and 7, the indicator device 100 indicates when the one-way check valve 82 is caused to open. Specifically, the indicator device 100 is actuated based upon a change in pressure differential in the bypass passageway 80. First and second pressure sensors 102, 104 are located upstream and downstream of the one-way check valve 82. Each of the first and second pressure sensors 102, 104 send a pressure signal to a controller 92, which is configured to compare the respective pressure signals and calculate the pressure differential across the one-way check valve 82. The controller has a programmable processor and a memory that stores pressure differentials or pressure differential limits or ranges corresponding to open and closed positions of the one-way check valve 82. The controller 92 is configured to compare the actual pressure differential across the one-way check valve 82 to the pressure differentials in the memory. Based on the comparison, the controller 92 is configured to control, for example a visual display or auditory alarm 105, to thereby indicate an open state of the one-way check valve 82, informing the operator that the filter 72 has become clogged.

In the example shown in FIGS. 8 and 9, the filter 72 is normally biased by a compression spring 86 into a seated position, see FIG. 8. In this state, the flow of cooling water passes through and is filtered by the filter 72. When the filter becomes clogged with debris, see FIG. 9, pressure from the flow of cooling water builds up and causes the filter 72 to move into an unseated position wherein continued flow of cooling water past the filter 72 (i.e. bypassing the filter 72) is permitted, see arrow 88. In this example, the filter 72 is a basket that is normally biased into the seated position by the compression spring 86. Thus, the bypass mechanism 78 allows continued flow of cooling water despite a clogged condition of the filter 72. The resiliency of the compression spring 86 can be chosen by the designer of the system to provide a certain range of restriction, above various normal operating pressures of the cooling water. Optionally, the sprayer body 54 can have a transparent or translucent window that facilitates visual identification of the filter 72 in bypass mode.

Optionally, the example shown in FIGS. 8 and 9 can further include an indicator device 200 that indicates when the filter 72 has been caused to move from the first position shown in FIG. 8 to the second position shown in FIG. 9. The type of indicator device 200 can vary from what is shown. In the illustrated example, the indicator device 200 includes an extension member 202 that is caused to protrude from the sprayer body 54 when the filter 72 moves from the first position to the second position, compare FIGS. 8 and 9. Thus, the extension member 202 visually indicates to an operator that the filter 72 has been caused to move from the first position to the second position. Optionally, the extension member 202 actuates a mechanical or electrical switch 204. The switch 204 is in communication with the controller 92, which as described in the example of FIGS. 6 and 7, is configured to control a visual or auditory alarm device 205. In this example, the controller 92 is configured to control the alarm device 205 based upon an actuation of the switch 204 to thereby indicate to an operator that the filter 72 has moved into the second position shown in FIG. 9, and thus the filter 72 has become clogged.

Thus, according to examples disclosed herein, the cooling water system for the outboard motor has redundant sprayers and filters, which provide an added layer of protection against a loss of function. Each sprayer 28, 30 is fed by an independent water source which protects the system from external and internal contamination clogging the sprayers 28, 30. The sprayers 28, 30 are stacked on top of each other and spray into the exhaust gas. To ensure the sprayers 28, 30 are installed correctly, the sprayer bodies 54 are configured so that one retainer 40 can be used to hold both sprayers 28, 30 in their intended position. The sprayer bodies 54 have bases 21 having different diameters to "poke-a-yoke" their installation with the correct through-bores 36, 38. The radial notch 42 in each sprayer body 54 allows the retainer 40 to hold the sprayer bodies 54 in position and maintain their rotation.

Referring now to FIGS. 2-5, an exhaust gas temperature sensor 90 is disposed in the conduit 25 at a location downstream of the cooling water sprayers 28, 30. The exhaust gas temperature sensor 90 is configured to sense temperature of the exhaust gas and cooling water mixture. The type of exhaust gas temperature sensor can vary and can include any one of a number of commercially available exhaust gas temperature sensors, for example Exhaust Gas High Temperature Sensors, sold by Amphenol. During research and experimentation, the present inventors have determined that the cooling water sprayers 28, 30 must be placed a sufficient distance D1 (see FIG. 5) above the bottom of the cooling water jacket to allow the spray pattern 61 to fully develop. This ensures that all non-water jacketed components downstream of the cooling water sprayers 28, 30 remain below their respective temperature limits. The present inventors have also determined that the orientation of the cooling water sprayers 28, 30 to the exhaust gas temperature sensor 90 is important. For example, the inventors have found that there should be an angle that is substantially offset from parallel with the cooling water sprayers 28, 30 and the orientation of the exhaust gas temperature sensor 90 to achieve accurate temperature readings from the exhaust gas temperature sensor 90. This is because the mixture of the cooling water and exhaust gas typically is not uniformly distributed inside the exhaust manifold 23, but will vary depending on operating conditions. The present inventors have also found that the distance D2 between the first and second exhaust sprayers 28, 30 and the 180 degree bend 24 should be large enough to prevent cooling water reversion in the exhaust manifold 23, i.e. flow of cooling water backwardly into the first and second banks of cylinders 14, 16.

In the illustrated example, the exhaust gas temperature sensor 90 radially extends into the exhaust manifold 23 and is positioned downstream with respect to the cooling water sprayers 28, 30 and close enough to the cooling water sprayers 28, 30 so that the first and second pairs of nozzles 56, 58 spray at least a portion of the respective first and second flows of cooling water onto the exhaust gas temperature sensor 90 under nominal flow conditions. In other words, the temperature sensor 90 radially extends into the exhaust manifold 23 and is positioned downstream of and within a spray pattern of the respective cooling water sprayers 28, 30 under nominal conditions. The temperature sensor 90 is thus specially positioned with respect to the cooling water sprayers 28, 30 so that if the respective first and/or second cooling water sprayer 28, 30 becomes at least partially blocked by debris, the respective first and/or second cooling water sprayer 28, 30 does not spray cooling water onto the exhaust gas temperature sensor 90 under nominal flow conditions. Thus, the system is designed to safely operate with one sprayer completely blocked, one sprayer completely blocked and the other sprayer partially blocked, or both sprayers partially blocked.

In the illustrated example, the present inventors have realized that the exhaust gas temperature sensor 90 is the closest non-water-jacketed component to the cooling water sprayers 28, 30. Thus, the present inventors have realized that the exhaust gas temperature sensor 90 can serve as an indicator of a loss of function of the cooling water sprayers 28, 30. Thus the cooling system can includes the controller 92 that is configured to identify a fault condition associated with the cooling water sprayers 28, 30 based upon the temperature of the exhaust gas and cooling water mixture sensed by the exhaust gas temperature sensor 90. Based upon the temperature sensed by the exhaust gas temperature sensor 90, the controller 92 is programmed to determine a loss of functionality of one or both of the cooling water sprayers 28, 30. The system is thus capable of safe operation with one sprayer completely blocked, one sprayer completed blocked and the other sprayer partially blocked, or both sprayers partially blocked. In certain examples, the controller 92 has a programmable processor and a memory that contains a lookup table of allowable exhaust gas temperature values or a range of allowable exhaust gas temperature values. If the temperature sensed by the exhaust gas temperature sensor 90 falls outside the allowable exhaust gas temperature values, the controller 92 is programmed to infer that a fault condition exists. Optionally the controller 92 can further be programmed to alter an operational characteristic of the outboard motor when a loss of functionality occurs, such as limiting available engine power to a set point that yields an exhaust gas temperature that is suitable to all downstream components, while continuing to allow the outboard motor to operate.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses disclosed herein may be used alone or in combination with other apparatuses. Various equivalents, alternatives and modifications are possible within the scope of the appended claims.

The invention claimed is:

1. A marine propulsion device comprising an internal combustion engine, an axially elongated exhaust manifold that conveys exhaust gas from the internal combustion engine, and a cooling water sprayer that is configured to spray a flow of cooling water radially outwardly toward an inner diameter of the exhaust manifold and perpendicularly relative to the axially elongated exhaust manifold, wherein the cooling water sprayer comprises an elongated sprayer body that perpendicularly extends into the exhaust manifold and conveys the flow of cooling water radially into the exhaust manifold and a nozzle that sprays the flow of cooling water perpendicularly and radially back outwardly onto the inner diameter in a fan-shaped pattern.

2. A marine propulsion device comprising:
an internal combustion engine, an exhaust manifold that conveys exhaust gas from the internal combustion engine, and a cooling water sprayer that is configured to spray a flow of cooling water radially outwardly toward an inner diameter of the exhaust manifold;
wherein the cooling water sprayer comprises an elongated sprayer body that radially extends into the exhaust manifold and conveys the flow of cooling water radially into the exhaust manifold, and a nozzle that sprays the flow of cooling water radially outwardly in a fan-shaped pattern;
wherein the sprayer body comprises a cylinder that radially extends into the exhaust manifold, and wherein the flow of cooling water is sprayed radially outwardly of the cylinder via the nozzle;
wherein the nozzle is formed by a tangential cutout in an outer surface of the cylinder; and
wherein the tangential cutout has an endwall upon which the flow of cooling water impinges and tangentially tapered sidewalls that are oriented radially outwardly and extend from the outer surface to the endwall.

3. The marine propulsion device according to claim 2, wherein the tangential cutout defines a three-sided radial aperture in the cylinder.

4. The marine propulsion device according to claim 3, wherein the sprayer body is elongated along a sprayer body axis and wherein endwall extends perpendicularly radially outwardly with respect to the sprayer body axis.

5. The marine propulsion device according to claim 4, wherein the nozzle is one of two nozzles that have a same shape, size and orientation, wherein the two nozzles are spaced apart from each other along the sprayer body.

6. The marine propulsion device according to claim 1, wherein the marine propulsion device comprises an outboard marine propulsion device and wherein the exhaust manifold vertically extends from the internal combustion engine and wherein the cooling sprayer horizontally extends into the exhaust manifold.

7. The marine propulsion device according to claim 1, further comprising a filter that filters the flow of cooling water flowing through the cooling water sprayer.

8. The marine propulsion device according to claim 7, wherein the filter is disposed in the sprayer body.

9. The marine propulsion device according to claim 8, wherein the sprayer body has an inlet that conveys the flow of cooling water to the filter, an outlet that conveys the flow of cooling water to the nozzle, and a bypass that conveys the flow of cooling water around the filter from the inlet to the outlet when the filter becomes clogged with debris.

10. The marine propulsion device according to claim 9, further comprising a one-way check valve in the bypass, wherein the one-way check valve is normally closed and caused to open under pressure from the flow of cooling water when the filter becomes clogged with debris.

11. The marine propulsion device according to claim 10, further comprising an indicator device that indicates when the one-way check valve is caused to open.

12. The marine propulsion device according to claim 11, wherein the indicator device is actuated based upon a change in pressure differential in the bypass.

13. The marine propulsion device according to claim 12, further comprising a controller which, based upon the pressure differential in the bypass, is configured to control an alarm to indicate to a user that the one-way check valve has been caused to open.

14. The marine propulsion device according to claim 8, wherein the filter is normally biased into a first position wherein the flow of cooling water passes through and is filtered by the filter, and wherein the filter is caused to move from the first position to a second position when the filter becomes clogged with debris, so that the flow of cooling water bypasses the filter when it is clogged with debris.

15. The marine propulsion device according to claim 14, wherein the filter comprises a basket filter that is normally biased into the first position by a spring.

16. The marine propulsion device according to claim 14, further comprising an indicator device that indicates when the filter is caused to move from the first position to the second position.

17. The marine propulsion device according to claim 16, wherein the indicator device comprises an extension member that is caused to protrude from the sprayer body and thereby visually indicate when the filter is caused to move from the first position to the second position.

18. The marine propulsion device according to claim 16, wherein the indicator device further comprises a switch that is actuated when the filter is caused to move from the first position to the second position.

19. The marine propulsion device according to claim 18, further comprising a controller that is in communication with the switch and configured such that actuation of the switch signals to the controller that the filter has moved into the second position, wherein the controller is further configured to control an alarm to indicate to a user when the filter has moved into the second position.

20. A cooling water sprayer for spraying a flow of cooling water into an exhaust manifold that conveys exhaust gas from an internal combustion engine, the cooling water sprayer comprising an elongated sprayer body that is configured to convey the flow of cooling water radially into the exhaust manifold and a nozzle configured to spray the flow of cooling water radially outwardly in a fan-shaped pattern toward an inner diameter of the exhaust manifold; wherein the nozzle is formed by a tangential cutout in the cylinder, the tangential cutout having an endwall upon which the flow of cooling water impinges and tangentially tapered sidewalls that are oriented radially outwardly and extend from the outer surface to the endwall.

21. The cooling water sprayer according to claim 20, wherein the tangential cutout defines a three-sided radial aperture in the cylinder, wherein the sprayer body is elongated along a sprayer body axis and wherein endwall extends perpendicularly radially outwardly with respect to the sprayer body axis.

22. A cooling water sprayer for spraying a flow of cooling water into an exhaust manifold that conveys exhaust gas from an internal combustion engine, the cooling water sprayer comprising an elongated sprayer body that is configured to convey the flow of cooling water radially into the exhaust manifold and a nozzle configured to spray the flow of cooling water radially outwardly in a fan-shaped pattern toward an inner diameter of the exhaust manifold; wherein the sprayer body has an inlet that conveys the flow of cooling water to a filter, an outlet that conveys the flow of cooling water to the nozzle, and a bypass that conveys the flow of cooling water around the filter from the inlet to the outlet when the filter becomes clogged with debris.

* * * * *